(12) United States Patent
Abdulrazzaq et al.

(10) Patent No.: US 11,492,858 B2
(45) Date of Patent: Nov. 8, 2022

(54) ESTIMATING THREE DIMENSIONAL NETWORKS OF PLUGS FOR DRILLING FLUID ADDITIVES

(71) Applicant: Halliburton Energy Services, Inc., Houston, TX (US)

(72) Inventors: Waseem Abdulrazzaq, Al-Khobar (SA); Reem Alburaikan, Al-Kohbar (SA); Hussain Al Qatari, Al-Khobar (SA)

(73) Assignee: Halliburton Energy Services, Inc., Houston, TX (US)

( * ) Notice: Subject to any disclaimer, the term of this patent is extended or adjusted under 35 U.S.C. 154(b) by 84 days.

(21) Appl. No.: 16/962,149

(22) PCT Filed: Oct. 1, 2019

(86) PCT No.: PCT/US2019/054066
§ 371 (c)(1),
(2) Date: Jul. 14, 2020

(87) PCT Pub. No.: WO2021/066812
PCT Pub. Date: Apr. 8, 2021

(65) Prior Publication Data
US 2022/0003058 A1 Jan. 6, 2022

(51) Int. Cl.
*E21B 21/00* (2006.01)
*E21B 49/08* (2006.01)
(Continued)

(52) U.S. Cl.
CPC .......... *E21B 21/003* (2013.01); *E21B 33/138* (2013.01); *E21B 49/003* (2013.01);
(Continued)

(58) Field of Classification Search
CPC ........ E21B 21/003; E21B 44/00; E21B 21/08; E21B 49/008; E21B 41/0092
See application file for complete search history.

(56) References Cited

U.S. PATENT DOCUMENTS 8,908,925 B2   12/2014   Hurley et al.
9,038,718 B1   5/2015    Karimi
(Continued)

FOREIGN PATENT DOCUMENTS

CN   104179493 A   * 12/2014
EP   2769207         8/2014

OTHER PUBLICATIONS

International Application No. PCT/US2019/054066, "International Search Report and Written Opinion", dated Jul. 1, 2020, 10 pages.

*Primary Examiner* — Zakiya W Bates
(74) *Attorney, Agent, or Firm* — Kilpatrick Townsend & Stockton LLP

(57) ABSTRACT

The effect of drilling fluids on particular subterranean environments can be analyzed to improve the formation of drilling fluids and additives such as lost circulation materials. A plug can be generated by a particle plugging apparatus by injecting lost circulation material into the particle plugging apparatus. A set of tests to be performed on the plug can be identified. The set of tests can include at least one physical test and at least one electronic test. A test schedule indicating the order in which each test of the set of tests is to be performed can be defined. The set of tests can be executed to generate a testing output. The testing output can be used to generate a three-dimensional network model of the plug.

20 Claims, 5 Drawing Sheets

(51) Int. Cl.
    *E21B 33/138*     (2006.01)
    *E21B 49/00*      (2006.01)
    *G01N 15/08*      (2006.01)

(52) U.S. Cl.
    CPC ........ *E21B 49/088* (2013.01); *E21B 49/0875* (2020.05); *G01N 15/0886* (2013.01); *E21B 2200/20* (2020.05)

(56) References Cited

U.S. PATENT DOCUMENTS

| | | |
|---|---|---|
| 9,201,026 B2 | 12/2015 | Walls et al. |
| 9,624,419 B2 | 4/2017 | Khammar et al. |
| 9,921,334 B2 | 3/2018 | Honarpour et al. |
| 2010/0139387 A1 | 6/2010 | Jamison et al. |
| 2011/0114318 A1* | 5/2011 | Roddy et al. .......... C09K 8/512 166/305.1 |
| 2014/0102188 A1 | 4/2014 | Murphy et al. |
| 2014/0182369 A1 | 7/2014 | Blue et al. |
| 2015/0062300 A1 | 3/2015 | Li et al. |
| 2019/0112922 A1 | 4/2019 | Murphy et al. |

* cited by examiner

ESTIMATING THREE DIMENSIONAL NETWORKS OF PLUGS FOR DRILLING FLUID ADDITIVES

TECHNICAL FIELD

The present disclosure relates generally to drilling a wellbore for extracting hydrocarbon operations. More particularly, the present disclosure relates to analyzing and optimizing the use of drilling fluids.

BACKGROUND

Drilling within subterranean environments typically includes the use of one or more types of drilling fluids. In some instances, additives may be included in the drilling fluid to add a particular property to the drilling fluid to suit the particular characteristics of the drill and subterranean environment. For instance, lost circulation materials may added to plug fractures and prevent further damage to a formation. Yet, if the lost circulation material is not properly formulated for a given formation, the lost circulation material may further damage the formation or the drilling platform. For instance, if the lost circulation material includes particles that are too small, then the lost circulation material may fail to plug the formation leading to further drill fluid loss. If the lost circulation material is too large, then the lost circulation material may, in addition to plugging the formation, increase the hydrostatic pressure exerted onto the formation increasing the likelihood of a secondary fracture.

DETAILED DESCRIPTION

Figure 1:
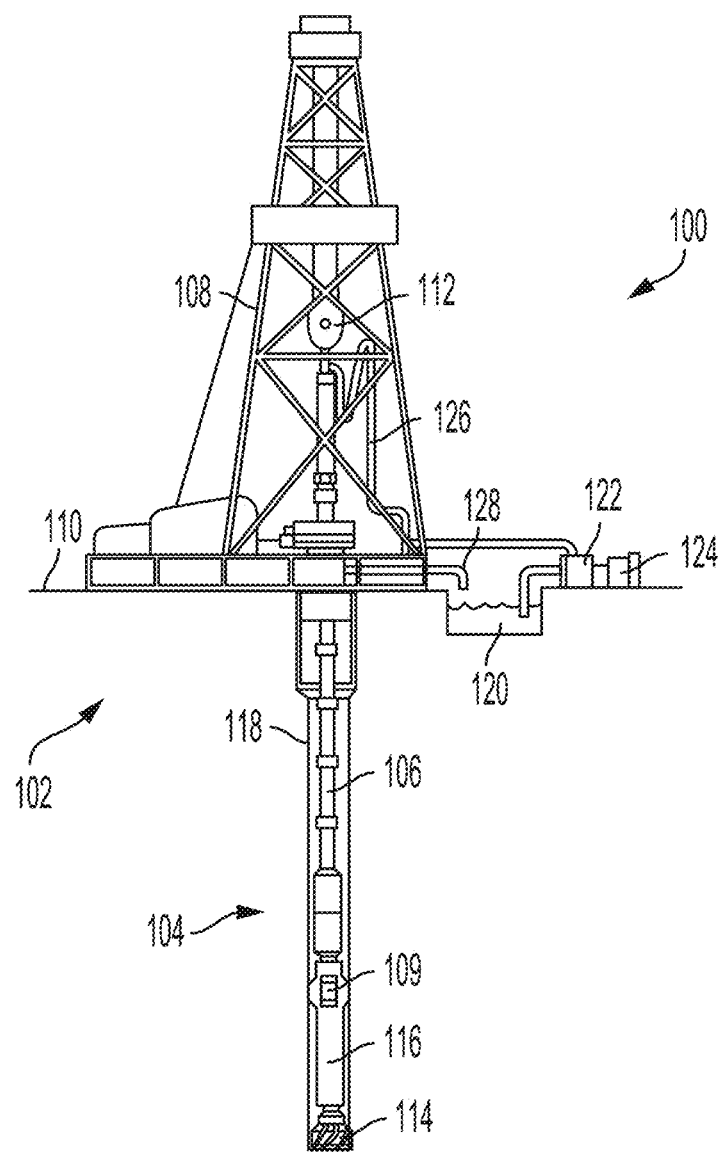
FIG. 1 is a cross-sectional view of a drilling system according to at least one aspect of the disclosure.

Certain aspects and features relate to analyzing and controlling the properties of lost circulation materials for use in drilling fluids to ensure that the drilling fluids have the requisite properties for a particular subterranean environment and drilling operation. Further aspects and features relate to modifying lost circulation materials to improve drilling fluid suitability for a particular drilling operation or environment.

In some instances, drilling fluids may not be properly tailored to the particular properties of the subterranean environment. For instance, formations surrounding the wellbore may be composed of one or more materials that have a particular formation pore pressure gradient. If the wrong drilling fluid is used, the drilling fluid may exert a hydrostatic pressure that is higher than the pore pressure gradient of the formation, the formations may fracture. The fracture may cause lost circulation as the drilling fluid begins to fill the fracture, which may in turn cause a sudden reduction in hydrostatic pressure. The reduced pressure may cause formation fluids such as, oil, water, gasses, etc. to enter the wellbore. This may cause a blowout damaging the drilling platform, wellbore, and other drilling systems.

A formulation of lost circulation materials may be added to the drilling fluid to bridge the pores of the fractured formation to repair the formation and prevent further lost circulation. If the precise pore geometry of the formation is unknown, the formulation of the lost circulation materials may not be able to repair the formation or may cause further damage to the wellbore. For instance, if the particles of the lost circulation materials are too small, the lost circulation materials may be unable to bridge the pores of the formation to stop the lost circulation through the fracture. If the particles of the lost circulation materials are too big, the lost circulation materials may further damage the formation by causing the drilling fluid to exert a higher hydrostatic pressure on the surrounding formations.

The formulation of drilling fluids and additives can be significantly improved by performing a series of electronic and physical tests on drilling fluids. For instance, a particle plugging apparatus may be configured according to the conditions within the subterranean environment. In some instance, the particle plugging apparatus may be configured using a core sample obtained from the subterranean environment. Once configured, the particle plugging apparatus may generate a plug. The plug may be extracted and a set of tests may be defined for the plug. The set of tests can include at least one electronic test and at least one physical test. Since the physical tests may destroy or alter the plug, the physical tests may be performed after the electronic tests. The properties and characteristics of the plug derived from the set of tests may be used to generate a network model of the plug. The network model can represent the pore networks within the plug.

The network model can be used to improve the drilling fluid of a drill site. For instance, the pore networks within the plug can provide an indication of particular drilling fluids or additives that are effective at bridging the pores of the plug. Since the pore geometry of the network model is approximately the same as the pore geometry of the formations within the subterranean environment, the network model can be used to formulate drilling fluids and additives, such as lost circulation materials, that can bridge the pores of the formation thereby repairing formations and preventing further damage. In some instances, the network model can be used in a simulation to simulate the effects of different fluids on the formation. This may enable improved drilling fluids that may be better suited to drilling within the particular subterranean environment of the drill site.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a drilling system 100 that may employ one or more principles of the present disclosure. A wellbore may be created by drilling into the earth 102 using drilling system 100. Drilling system 100 may be configured to drive bottom hole assembly (BHA) 104 positioned or otherwise arranged at the bottom of a drill string 106 extended into the earth 102 from derrick 108 arranged at the surface 110. Derrick 108 includes kelly 112 that can be used to lower and raise drill string 106. BHA 104 may include a drill bit 114 operatively coupled to drilling tool 116, which can be moved axially within drilled wellbore 118 as attached to or part of drill string 106. The drill string may include one or more sensors 109 to obtain measurements associated with conditions of the drill bit and wellbore. The measurements may be returned to the surface through the cabling (not shown) or by one or more wireless transceivers (not shown). Sensors 109 can include, by example only, any sensor that produces a signal of characteristic associated with the drilling tool 116, wellbore 118, or subterranean environment. Sensors 109 may also produce a signal from which properties of the drilling fluid may be derived. Examples of such characteristics can include lubricity, viscosity, temperature, hydrostatic pressure, density, a composition of the drilling fluid and additives therein such as lost circulation materials, and the like.

During drilling operations, drill bit 114 penetrates the earth 102 and thereby creates wellbore 118. BHA 104 provides control of drill bit 114 as it advances into the earth 102. Drilling fluid or "mud" from mud tank 120 may be pumped downhole using a mud pump 122 powered by an adjacent power source, such as a prime mover or motor 124. The drilling fluid may be pumped from mud tank 120, through stand pipe 126, which feeds the mud into drill string 106 and conveys the drill fluid to drill bit 114. The mud exits one or more nozzles (not shown) arranged in drill bit 114. After exiting drill bit 114, the mud circulates back to the surface 110 via annulus defined between wellbore 118 and drill string 106, and in the process returns drill cuttings and debris to the surface. The cuttings and mud mixture are passed through flow line 128 and processed and a cleaned mud is returned down hole via stand pipe 126 once again.

Drilling fluids may perform a number of functions within the wellbore in addition to removing cuttings from the wellbore. For instance, drilling fluid composition may be designed to cool the drill bit, lubricate the drill bit and wellbore, minimize formation damage, remove cuttings, suspend cuttings within the drilling fluid when drilling operations are halted, control corrosion, control formation pressures, seal permeable formations, maintain wellbore stability, minimize environment contamination, combinations thereof, and the like. In some instances, the particular composition of the drilling fluid may be based on characteristics of the subterranean environment and the drill bit. For instance, the drilling fluid composition may be selected to ensure it is thixotropic such that a halt in operations does not allow the cuttings to sink to the bottom of the wellbore. If the cuttings are allowed to sink, unintended bridging can occur, which may cause wellbore cleaning problems and stuck pipe.

One or more additives may be added or removed from drilling fluid to ensure the precise properties of the fluid are maintained given the real-time characteristics of the subterranean environment during drilling operations. For instance, if lost circulation of the drilling fluid is detected, a lost circulation material may be added to the drilling fluid to prevent further loss of drilling fluid and wellbore pressure. The lost circulation materials may be selected based on an analysis of the subterranean environment and optionally one or more sensors indicating the cause of lost circulation. If the lost circulation is caused by an unintended fracture, the lost circulation material may be selected based on the type and size of the fracture as well as the type of formation that fractured.

In some instances, drilling fluid, or the additives within, may be tested on the surface before or after being pumped into the wellbore to ensure that the drilling fluid includes particular properties for a given subterranean environment. In some instances, a sample of the drilling fluid may be obtained from the drilling fluid returning from the wellbore before the drilling fluid reaches mud tank 120. In other instances, the drilling fluid may be tested after leaving mud tank 120 before being pumped back into the wellbore. Testing may identify the particular composition of the drilling fluid or additives as well as the presence of contaminants such as hydrocarbons or cuttings. Testing operations can ensure that the drilling fluids and additives continuously include requisite properties given the contemporaneous characteristics of the subterranean environment and the drilling operations.

Figure 2:
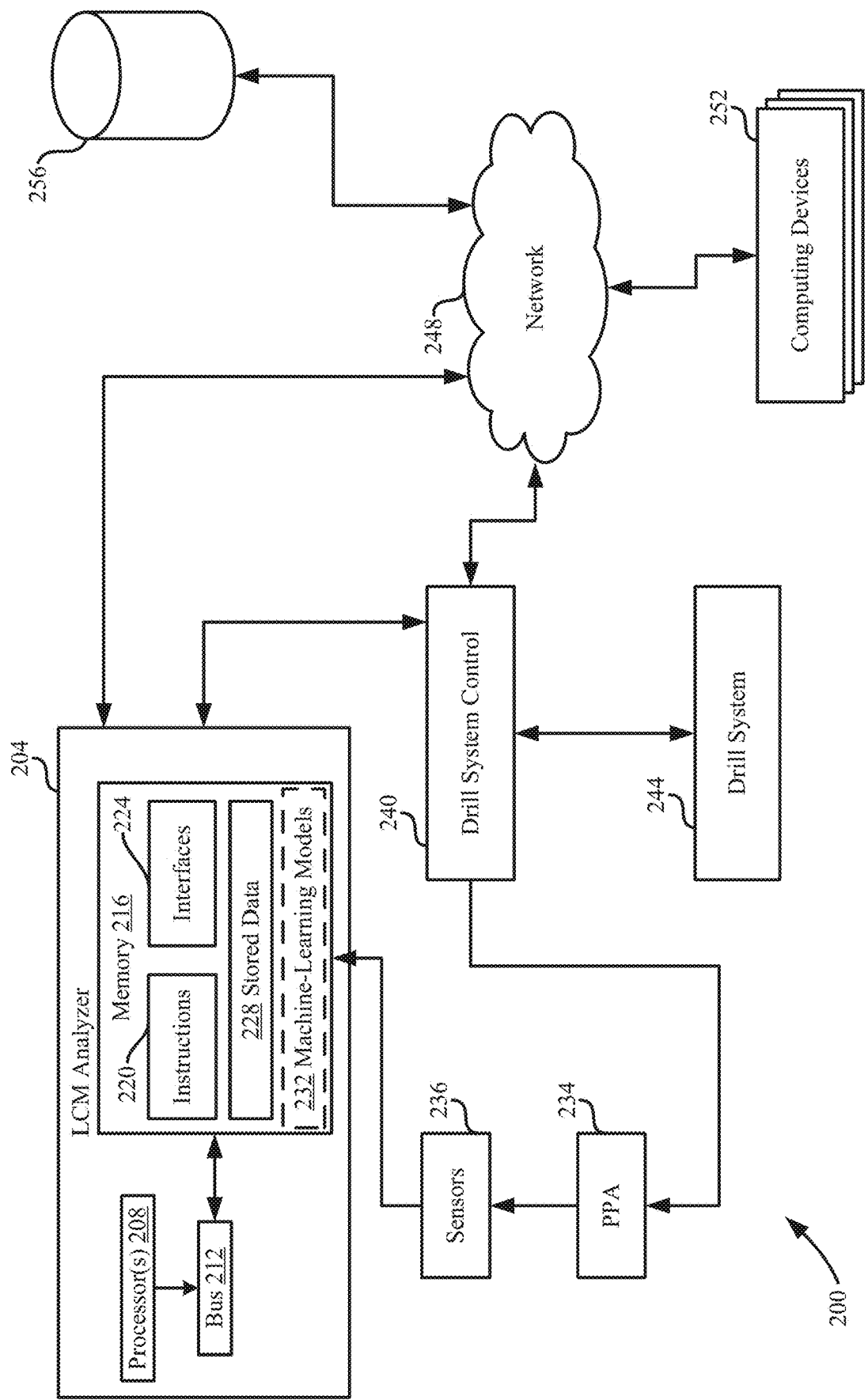
FIG. 2 is a block diagram of a lost circulation material and drill fluid control system according to at least one aspect of the disclosure.

FIG. 2 is a block diagram of a lost circulation material and drill fluid control system according to at least one aspect of the disclosure. Lost circulation materials (LCM) may be analyzed using LCM analyzer 204. LCM analyzer 204 may positioned on site of drilling operations or remotely therefrom. In some instances, LCM analyzer 204 may be a system of two or more interconnected devices. For instance, a first device may be a handheld device that includes an interface for communicating with an operator and one or more other LCM analysis devices. Tests may be executed the first device and by the other LCM analysis devices and the results of which may be transmitted to the first device for display to the operator. Each of the other LCM analysis devices may include the same, similar, or different components. For instance, each of the other LCM analysis devices may be specifically designed for a particular test or tests. In other instances, LCM analyzer 204 may include all of the components to perform each of the tests.

LCM analyzer 204 can include one or more processors 208 coupled to memory 216 through a bus 212. Memory 216 may be a non-transitory computer-readable medium. Non-transitory computer-readable media may include any type of non-volatile memory. Examples of non-transitory computer-readable media include, but are not limited to, flash memory, magnetic memory, read-only memory, compact disks, electrically erasable programmable read-only memory (EEPROM), and the like.

Memory 216 may store instructions 220 and one or more interfaces 224 such as application programming interface, data interfaces, network interfaces, hardware interfaces, and the like. Interfaces 224 may enable receiving or transmitting data internally or externally. Instructions 220 can include one or more sets of instructions that execute using one or more processors 208 to analyze an input drilling fluid. In some instances, instructions 220 can execute to control network communication, such as with drill system control 240 and network 248, perform diagnostics to maintain proper operation of LCM analyzer 204, define a historical record of lost circulation materials for a particular drilling system, combinations thereof, and the like. LCM analyzer 204 may communicate with one or more devices over a wired or wireless connection using one or more communication protocols. In some instances, LCM analyzer 204 may communicate with some devices over one protocol and other devices over a different protocol. For instance, LCM analyzer 204 may communicate with remote devices using a first communication protocol such as TCP/IP and devices in closer proximity using a near-field communication protocol such as Bluetooth.

LCM analyzer 204 may analyze lost circulation materials using one or more sensors 236 that measure one or more properties of the lost circulation material. Types of properties can include, but are not limited, porosity, permeability, mineralogy, size, packing, grain, matrix permeability, texture log, morphology, particle geometry, or the like. Sensor 236 may generate electrical signals as a representation of measurements of a property of the lost circulation material. The electrical signals may be digital or analog signals. Interface 224 can receive the electrical signals and convert them to an alphanumeric value associated with a particular measurement type or sensor type. The sensor measurements can be stored in stored data 228. In some instances, instructions 220 may direct the acquisition of the sensor measurements. For instance, instructions 220 may cause sensors 236 to obtain measurement once or in predetermined intervals. The predetermined interval may be based on a value stored in stored data 228, output from machine-learning models 232, or received as a command from a remote device such as drill system controller 240. The predetermined interval may be changed to increase or decrease the measurements received within a given time period.

In some instances, sensors 236 may obtain one or more measurements from one or more external devices such as a particle plugging apparatus (PPA). PPA 234 may be used to prepare a lost circulation material plug. PPA 234 may include one or more filter media selected based on characteristics of the subterranean environment or a particular formation within the subterranean environment. For instance, drill system control 240 may transfer characteristics of the subterranean environment or particular formations within, from drill system 244 to PPA 234. Each filter medium may determine the ability of particles in the drilling fluid such as lost circulation materials to effectively bridge the pores in a filter medium. If more than one filter medium is used, each filter medium may have a different porosity such as different sized pores, number of pores, pore geometry, etc.

An input fluid, such as drilling fluid, lost circulation, or a combination thereof, may be pumped into PPA 234 at a particular pressure. If the input fluid passes through a filter medium, then the input fluid may not be sufficient to plug the fracture. If the input fluid does not pass through the filter medium, then the input fluid may be sufficient to plug the fracture. PPA 234 may output an LCM plug for further electronic and physical testing to, among other things, estimate a three-dimensional network established by the input fluid integrating with the filter medium. In some instance, the LCM plug may include filter cake (e.g., fluid formation that occurs when a fluid collects on the filter medium without passing through). In other instances, such as when filter medium is impregnated with the input fluid the LCM plug may include the combination of drilling fluid and filter medium, or the LCM plug may include the drilling fluid as extracted from the filter medium.

Stored data 228 may include historical records corresponding to lost circulation materials used during one or more drilling operations at drill system 244. For instance, stored data 228 may include historical data associated lost circulation materials used during the current drilling operation or other drilling operations such that those with similar conditions as the current drilling operation. For instance, stored data 228 may include lost circulation material analysis and data dating back to the initiation of drilling operations at drill system 244. Stored data 228 may store the value of characteristics of the lost circulation materials as well as characteristics of the wellbore, subterranean environment, and subterranean formations. In some instances, the characteristics of the wellbore, subterranean environment, and subterranean formations may be received from drill system control 240 or one or more remote device, such as computing device 242, over network 248. In other instances, LCM analyzer 204 may obtain the characteristics of the wellbore, subterranean environment, and subterranean formations from database 256 through network 248. The data structures may include raw data, alphanumerical data, or audiovisual data such as images, graphs, audio, video, etc.

Additional properties of the drilling fluid may be obtained from one or more machine-learning models 232. One or more machine-learning models 232 may process sensor measurements to derive an output indicating properties of the drilling fluid that may not be directly measured using sensors 236. For example, sensor data from PPA 234 and sensors 236 may be used as input into machine-learning models 232 to derive pore geometry of the integrated filter media and lost circulation material, which may be used to estimate a three-dimensional network of the plug.

Feature sets may be defined using sets of one or more types of sensor measurements over a time interval. In some instances, a feature set may include at least one measurement from each sensor of LCM analyzer 204. In other instances, a feature set may include at least one measurement from one or more sensors such that multiple feature sets may be obtained from the measurements obtained from sensors 236. This may be advantageous when some sensors obtain measurements over different intervals from other sensors. For example, a first feature set may be defined for sensors that obtain measurements over a same first time interval and a second feature set may be defined for sensors that obtain measurements over a same second time interval. In still yet other instances, the measurements included in a feature set may be based on a particular sensor type such as pressure, flow sensors, etc.

Machine-learning models may be trained using stored feature sets from contemporaneously collected sensor data, historical data, or generated data. Machine-learning models 232 may be trained using supervised or unsupervised learning. In supervised learning, each feature set can include labeled data that indicates an expected value of one or more properties of the drilling fluid given a particular set of input sensor measurements. The machine-learning model may use the feature set, as input, and the labels, as expected output, to define functions that may reproduce the expected output from an input. The accuracy of the one or more functions, and the machine-learning model, may depend on the number of feature sets used to train the machine-learning model. Examples of algorithms that can be used for supervised learning include, but are not limited to, regression such as random forest, linear and non-linear; Bayesian statistics; neural networks; decision trees; Gaussian process regression; nearest neighbor; long short-term memory; deep learning algorithms; combinations thereof and the like.

In unsupervised learning, the feature sets may not be labeled such that the machine-learning model may not have access to the expected output of a given input. Since the expected values are unknown, the machine-learning model may use different algorithms from those used during supervised learning. Unsupervised learning may focus on identifying correlations between (1) two or more measurements of a feature set, (2) one or more measurement and another feature set, or (3) combinations thereof. Unsupervised learning may identify one or more sensor measurements that may be an indicator for an estimated value of an additional property, presence or absence of a particular component of the drilling fluid such as an additive, correlated properties, new properties, combinations thereof and the like.

In some instances, features of a feature set may be weighted before or during processing by a machine-learning model. For example, the machine-learning model may indicate that certain measurements are better indicators for a particular than others. Those measurements may be weighted higher when processing future feature sets then the others. Examples of unsupervised learning algorithms for machine-learning models include, but are not limited to, clustering, neural networks, outlier detection, combinations thereof, or the like.

The machine-learning models may be trained over a predetermined interval of time. In some instances, training may continue until predetermined threshold is met. For example, training may continue until a predetermine number of feature sets are processed by the machine-learning model or a predetermined accuracy value is reached. Accuracy may be determined by passing labeled feature sets into the machine-learning model and matching the output to the label. In other instances, accuracy may be determined based on user analysis of the training process, the output of the machine-learning model on contemporaneously collected measurements, or the rate at which the machine-learning model generates an output from a given input. In some instances, the machine-learning model may be continuously trained, first using the training feature sets and then using contemporaneously obtained measurements from sensors 236 to further improve the accuracy of machine-learning models 232. The machine-learning may be re-trained or discarded and re-instanced (and trained) upon detecting the accuracy value falling below a threshold value.

LCM analyzer 204 may output measured and derived properties of the drilling fluid to drill system control 240, one or more databases 256, or to one or more computing devices 252. In some instances, one or more user interfaces may be presented that provide a graphical representation of the measured and derived properties of the drilling fluid. Drill system control 240 can control the operation of drill system 244. In some instances, the output from LCM analyzer 204 may be used to reformulate the drilling fluid that is in operation. For instance, drill system control 240 may receive the output and determine that the properties of the current drilling fluid may not be capable of preventing further fluid loss in a formation. Drill system control 240 may generate a request to drill system 244 to change the composition of lost circulation material by, for example, increase an amount of fibrous, flaky, or granular materials within the lost circulation material. In some instances, drill system control 240 may generate a new drilling fluid composition and output the new drilling fluid composition to drill system 244.

Drill system 244 may include drilling system 100 of FIG. 1 and include one or more control devices that manipulate the operations of drill system 244 and the composition of drilling fluids. For example, drill system 244 may include one or more tanks of individual drilling fluid components and additives that can be mixed together to form a particular drilling fluid with particular desirable properties. Drill system control 240 may receive an indication of the particular composition of drilling fluid that is to be used in drilling operations or a request to modify the drilling fluid that is currently in use at drill system 244. In some instances, LCM analyzer 204 may transmit the new drilling fluid composition or the modification to the drilling fluid direct to drill system 244.

One or more fluid analysis devices such as LCM analyzer 204, drill system control 240, one or more databases 256 may communicate via network 248. Network 248 may include one or more interconnected networks. Examples of networks include, but are not limited to, local area networks, wide area networks, cellular networks, WiFi networks, cloud networks, combinations thereof, and the like. LCM analyzer 204 can include one or more network interfaces that operate along with one or more transceivers (not shown) to enable LCM analyzer 204 to communicate with remote devices. The one or more transceivers can enable wired or wireless communications with drill system control 240 and network 248.

Figure 3:
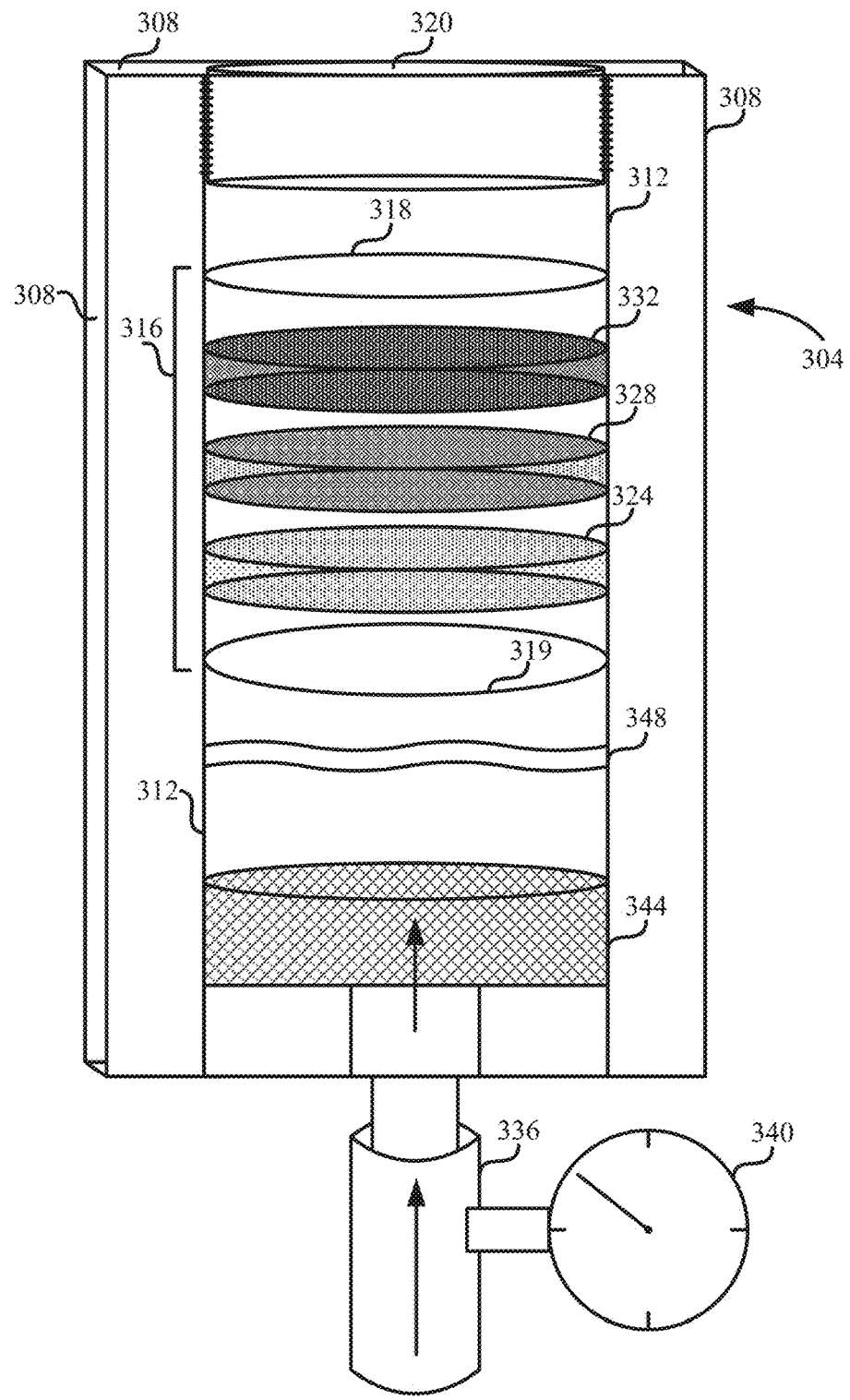
FIG. 3 is a diagram of a particle plugging apparatus according to at least one aspect of the disclosure.

FIG. 3 is a diagram of a particle plugging apparatus (PPA) system 300 according to at least one aspect of the disclosure. PPA 304 can be a device that tests the ability of particles in a fluid to effectively bridge the pores in a filter medium. The filter medium may selected to correspond to a particular formation with a subterranean environment. If the fluid bridges the pores of the filter medium, then it is likely that the fluid would also bridge the pores of the particular formation thereby reducing formation damage in the subterranean environment, preventing formation fluids from entering the wellbore, preventing drilling fluid loss through the open formation, and the like.

PPA 304 includes a housing 308. Housing 308 includes inner walls 312 that define a cavity within housing 308. The dimensions of the cavity may enabled an LCM cell 316 to be completely positioned within the cavity such that a fluid flowing from the bottom of the cavity towards the top of the cavity may be forced through at least one filter medium such as 324, 328, or 328 and cannot flow around the filter medium. LCM cell 316 may be bounded by a top surface 318, bottom surfaces 319. The cavity may be of a same general shape as LCM cell 316. For instance, as shown LCM cell has a cylindrical shape. The cavity may be of a same cylindrical shape with a proportionally larger length and diameter than the length and diameter of LCM cell 316 such that LCM cell 316 may be completely positioned within the cavity. The shape of LCM cell 316 may be substantially square, rectangular, conical, or any other shape.

Housing 308 may include a first opening on a surface of housing 308. The opening may enable LCM cell 316 to be positioned in the cavity or removed therefrom. The opening may be sealed using end cap 320. End cap 320 may be of a same shape as the opening and be removably affixed within the opening so as to create an gas-tight seal that prevents the flow of liquids and gasses into or out of the cavity. As shown, end cap 320 has a cylindrical shape that matches the shape of the cavity and of LCM cell 316. For instance, end cap 320 may include one or more O-ring or gasket that may provide a seal. In some instances, the O-rings may be include a material suitable for high temperature and pressure environments such as, but not limited to perfluoroelastomers or the like.

End cap 320 may include male threads on the outer surface of the end cap 320 that integrate with corresponding female threads positioned on a portion of the opening. End cap 320 may seal the opening using a clockwise rotation to form a gas-tight seal. Removing end cap 320 may be performed by rotating end cap in a counter-clockwise direction. In some instances, end cap 320 may be affixed by a rotating counter-clockwise and removed by rotating clockwise. In some instances, end cap 320 may be of a different shape than a cylindrical such as square, rectangular, triangular, trapezoidal, or the like. In those instances, end cap 320 may be removable affixed to housing 308 through other means such as through screws or other such fixation devices, pressure, electromagnetic, or the like.

LCM cell 316 may include a single filter medium such as 324, 328, or 332 or multiple filter media such as 324, 328, and 332. Each filter medium may have a particular material composition that provides a particular porosity and permeability. The material composition may be selected such that the porosity and permeability of the resulting filter medium corresponds to a formation within a subterranean environment. Examples of material compositions can include sintered metal, aluminum oxide, rock, and the like. In some instances, the filter media may be composed of a core sample taken from the formation. When only one filter medium is used, the filter medium may be positioned near the top of LCM cell 316. When multiple filter media are used each filter medium may be positioned from most permeable to least permeable with the most permeable filter medium being positioned closest to the pressure source.

PPA 304 may operate by exerting an upward pressure on a drilling fluid to push the drilling fluid through the filter media. The upward pressure may be advantageous as it eliminates the effect of gravity when testing drilling fluids. In some instances, a fluid 348 such as drilling fluid, lost circulation material, or the like may be added to the cavity before end cap 320 seals the cavity. In other instances, the drilling fluid may be pumped in after end cap 320 seals the cavity through a fluid port below LCM cell 316.

The pressure source of PPA 304 may include a pressurized fluid or gas received from connector 336 that exerts an upward force on a piston 344. The upward movement of piston 344 reduces the volume within the sealed cavity and increases the pressure with the cavity and exerted on the fluid 348. Regulator 340 may be used to regulate the pressure exerted by the pressurized fluid or gas in connector 336 and thereby also regulate the upward force of piston 344. The regulator may include a gauge that indicates a current amount of pressure being exerted. The regulator may include a valve to prevent pressure from exceeding a predetermined amount. In some instance, the temperature of the cavity may be regulated to match a temperature of the subterranean environment. Temperature regulation may be achieved by heating and cooling elements (not shown) positioned within housing 308 along inner walls 312.

One or more sensors such as sensors 236 of FIG. 2 may be positioned within the cavity to measure the ability of the fluid to bridge the pores of the filter media. In some instances, the sensors may obtain measurements over the time interval in which pressure is applied on the fluid. In other instances, the measurements may be obtained over a time interval that begins once the pressure exerted on the fluid exceeds a first threshold pressure and ends once the pressure exerted on the fluid falls below a second threshold pressure, where the second threshold pressure is less than or equal to the first threshold pressure. In still yet other instances, the measurements may be obtained after the pressure within the cavity returns to approximately the same pressure outside the cavity.

PPA 304 may include a display device affixed to housing 308 for enabling input of settings that control the conditions of PPA 304 such as pressure thresholds, timing, temperatures, test fluids, and the like. The display device may also include warning indicators to alert an operator of unsafe conditions such as when the pressure within the cavity may exceed the surface pressure capacity of inner walls 312 or housing 308 or when a pressure leak is detected such as if end cap 320 is not secured. In some instances, upon detecting an unsafe condition, PPA 304 may automatically cease operations reducing the pressure with cavity to pre-operation levels.

The display device may also display values that correspond to measurements obtained from sensors within PPA 304. The measurements may indicate whether particles of the test fluid bridge the pores of the filter media by measuring an amount of fluid that passes through the filter media or a flow rate. The measurements may be displayed in real-time. In some instances, PPA 304 may include a non-volatile storage that stores current and historical measurements. PPA may also include a network interface to transmit the measurements obtained from the sensors to one or more remote devices. PPA may transmit data including the measurements over a wired or wireless connection to the one or more remote devices.

After a predetermined time interval, PPA 304 may terminate operations and return the cavity to pre-operations pressure. End cap 320 may be removed and the LCM cell may be retrieved. For instance, an LCM plug may form within the LCM cell after pressure is exerted on the fluid for the predetermined time interval. The LCM plug may be filter cake, a combination of fluid integrated with a filter medium, or a combination thereof. The LCM plug may be extracted for further electronic and physical testing.

Figure 4:
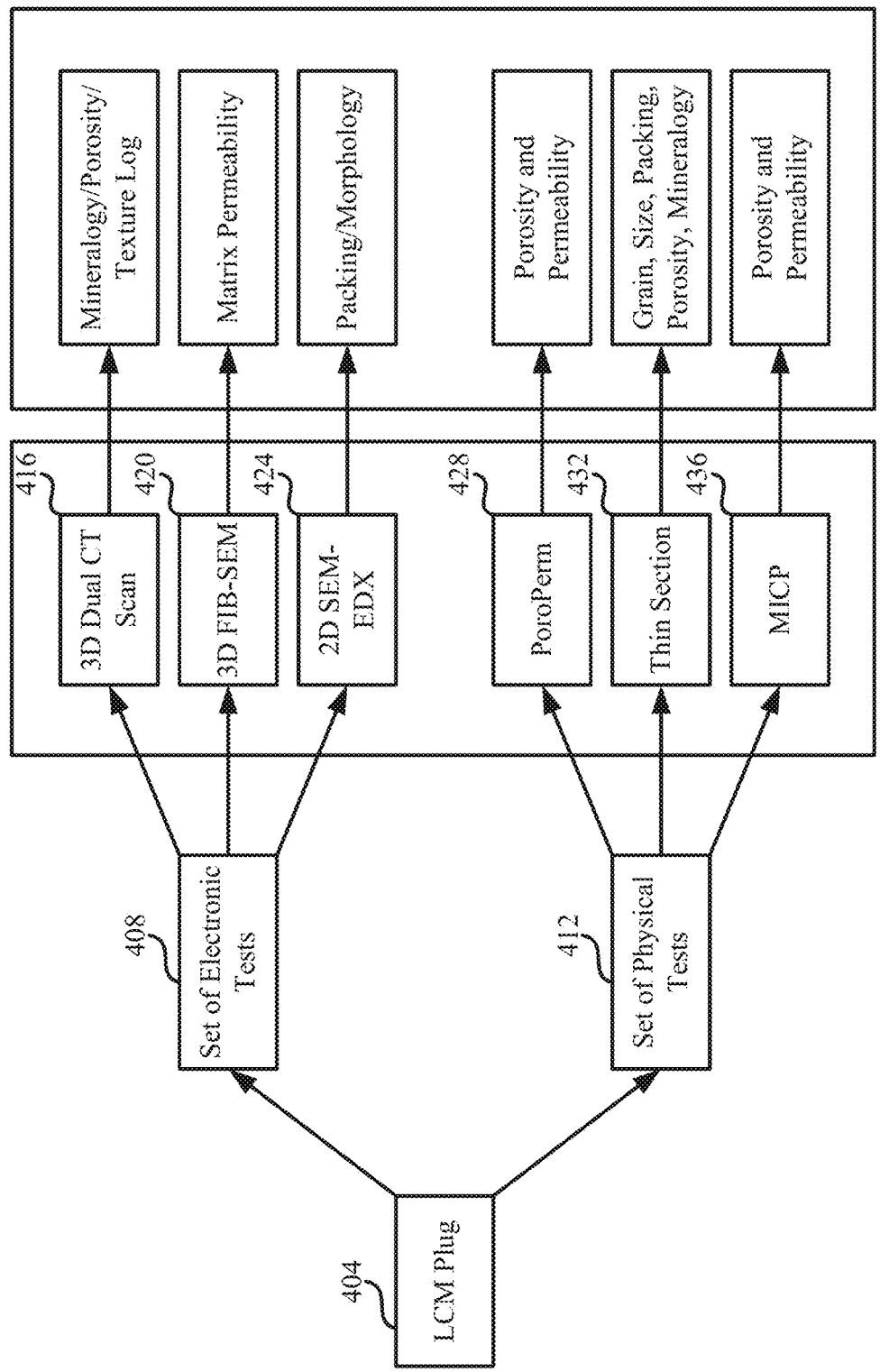
FIG. 4 is a block diagram of a lost-circulation-material analysis system according to at least one aspect of the present disclosure.

FIG. 4 is a block diagram of a lost-circulation-material analysis system according to at least one aspect of the present disclosure. The circulation-material analysis system may include a set of tests that may be performed on an LCM plug. The set of tests may include one or more physical tests and one or more electronic tests. The physical tests and the electronic tests may be performed in parallel and asynchronously. In some instances, since each physical test tests for the same properties of drilling fluid as other physical tests, not all physical tests may be performed. Likewise, since each electronic tests may test the same properties of drilling fluids as other electronic tests, not all electronic tests may be performed. In other instances, each physical test and at least one electronic test may be performed. In still yet other instances, since physical testing may damage the LCM plug, each electronic test may be performed and at least one physical may be performed. In still yet other instances, each physical test and each electronic test may be performed on the LCM plug.

The lost-circulation-material analysis system can include preparing an LCM plug 404 using a particle plugging apparatus. The particle plugging apparatus may prepare LCM plug 404 based using a filter with a permeability that corresponds to a known fracture size and under a pressure and temperature that corresponds to a location within a subterranean environment. Once LCM plug 404 is prepared, a set of tests may be defined from a first set of electronic tests 408 and a second set of physical tests 412.

The set of electronic tests 408 may include any electronic based test. Examples of electronic tests include two-dimensional or three-dimensional digital imaging such as computed tomography, x-ray imaging, gamma imaging, combinations thereof and the like. For instance, a first electronic test may include three-dimensional multi-energy computed tomography scans 416. Computed tomography scans uses high-energy electromagnetic radiation such as x-rays to generate images of the internal composition of the LCM plug at a variety of angles, each angle producing a cross-sectional view of the composition of the LCM plug. The images can be stitched together to generate a three-dimensional image using two or more of the images. Dual-energy computed topography may use two different high-energy electromagnetic radiation sources such x-rays and gamma-gamma rays or x-rays and lower energy x-rays. Dual-energy may provide for an increased resolution three-dimensional image than a signal-energy computed tomography scan. In some instance, a multiple-energy computed tomography may be used. The high-energy electromagnetic radiation of the computed tomography scan can be used to identify a first set of properties 418 of the LCM plug such as, but not limited to, density, mineralogical composition, porosity, permeability, texture log, and the like. Other properties of the LCM plug may be derived from one or more of the above properties.

Another example of an electronic test may be a three-dimensional focused-ion-beam scanning-electron microscopy (FIB-SEM) scan 420. Focused-ion-beam scanning-electron microscopy. Scanning-electron microscopy generates images of a sample such as an LCM plug by focusing a beam of electrons on the sample. By measuring the returning electrons, an image of the sample can be made. Focused-ion-beam scanning-electron microscopy may operate in a similar manner by focusing a beam of ions rather than electrons. In some instances, both electrons and ions may be used to generate the image. FIB-SEM 420 may generate images that detail sub-micron features of the sample. In some instances, a FIB-SEM tomography scan may be performed by sequentially milling an upper surface of the sample. This may destroy the upper surface exposing a proximate layer of the sample to FIB-SEM imaging. The images may be combined to generate a three-dimensional image. Milling may be performed using an ion-beam positioned perpendicular to the sample. As this may destroy portions of the sample, other electronic tests may be performed prior to a FIB-SEM tomography scan. FIB-SEM 420 may be used to define matrix permeability 422 of the plug.

Still yet another example of an electronic test may be a two-dimensional scanning-electron-microscopy with energy dispersive electromagnetic spectroscopy SEM-EDX 424. SEM-EDX 424 can generate high resolution image of surface topography using a focused electron beam. The electron beam may generate many lower energy secondary electrons. The energy of the secondary electrons may be based on the surface topography of the sample. An image may be generated by measuring the energy intensity of the secondary electrons as a function of the position of the electron beam. Since the electron beam can have a very high positional tolerance, this may generate a high-resolution image of the surface topography of the sample. The electron beam may additionally generate backscattered electrons and electromagnetic radiation such as X-rays. The intensity of backscattered electrons and electromagnetic radiation may be a function of the atomic number of the surface material of the sample. SEM-EDX may be used to identify or calculate a second set of properties 426, which include, but is not limited to, material composition of samples, morphology of the sample surface, topology of the sample surface, packing microarchitecture, combinations thereof, and the like.

An example of a physical test may include poroperm 428. Poroperm 428 refers a petrophysical analysis of a sample such as LCM plugs that characterizes porosity and permeability of the sample. Poroperm 428 may include multiple physical testing methods that include analyzing how compressional waves and shear waves are affected by a sample such as a core sample retrieved from a subterranean environment or an LCM plug. For instance, the velocity of a generated compressional wave may be measured as it pass through the sample and after passing through the sample. The variations in velocity may be used to calculate the porosity, permeability, and material composition of the sample. The velocity of a generated shear wave may be measured as it passes through the sample and after passing through the sample. The variations in velocity of the shear wave may also be used to calculate the porosity, permeability, and material composition of the sample. In some instances, the velocity measurements of both compressional and shear waves may be used with the density of the sample to compute the compressive strength of the sample. The compressive strength may indicate the compressive stress threshold that, when exceeded, may cause damage to the sample. The compressive strength of the sample may be used to identify drilling fluids or additives like lost circulation materials that may be safely used within a subterranean environment without damaging the formations within the subterranean environment. Poroperm may be used to identify, calculate, or measure a third set of properties 430 that includes the porosity and permeability of the plug.

Another example of a physical tests may include thin section microscopy 432 in which a portion of a sample may be dissected into thin sections and each section separately analyzed via microscope. For instance, a sample for a microscope may be prepared such that each section has a thickness that is approximately 0.03 millimeters. For another example, a sample for scanning electron microscopes or transmission electron microscopes may be prepared such that each section has a thickness that may be between approximately 2 micrometers and 30 micrometers. The relative thicknesses of the preceding examples are merely illustrative and each section may be prepared to be other thickness without departing from the present disclosure. Thin section microscopy 432 may be used to defined a fourth set of properties 434 that includes grain, size, packing, porosity, mineralogy, permeability, and the like of the sample. In some instances, thin section microscopy 432 may be used to determine the ability of a particular lost circulation material to bridge the pores of a sample, which may indicate the ability of the lost circulation material to plug fractures to prevent damage or further damages to formations.

Yet another example of a physical test is mercury injection capillary pressure (MICP) 436. Capillary pressure may include an amount of pressure required to force the non-wetting of a fluid phase to displace the wetting phase of the fluid within a capillary. Capillary pressure may be measured by injecting mercury into a sample such as a core sample or LCM plug. In some instances, the sample may be excavated, cleaned, or a combination thereof prior to mercury injection. Mercury may be injected with an increasing pressure such as in stepwise intervals. The percentage of the sample pore volume saturated with mercury at each interval may be measured. In some instances, each measurement may occur after allowing sufficient time for an equilibrium to be reached. A drainage curve may be generated by plotting the measured pressure against the mercury saturation. The maximum saturation may be the percentage of pore volume of the sample saturated by mercury at the maximum mercury injection pressure.

Once the maximum mercury injection pressure is reached, the injection pressure may be decreased in stepwise intervals. This may enable air to enter into the pore of the sample displacing the mercury. The amount of mercury that removed from the sample at each interval may be represented as a percentage of total pore volume. In some instances, a withdrawal curve may be generated which may include the decreasing injection pressure against the mercury saturation. In some instances, some mercury may remain in the in the sample after the pressure is reduced to a minimum. The mercury remaining may be referred to as the residual mercury saturation.

The mercury injection capillary pressure test may be used to calculate the distribution of pore volume accessible by pore throats given a particular radii to determine the effective radii of pore throats and the withdrawal efficiency, which is the efficiency with which the non-wetting phase can be withdrawn from the pore system. The effective radii of pore throats and withdrawal efficiency may be used to define a fifth set of properties 438 that includes, but is not limited to, the porosity of the sample, the permeability of the sample, to model pore geometry of the sample such as defining a three dimensional network of the pores, combinations thereof, and the like. In some instances, the data obtained from the air-mercury testing conditions of the mercury injection capillary pressure test may be converted to a brine or oil hydrocarbon system to approximate the effective radii of pore throats and the withdrawal efficiency of reservoirs within a subterranean environment.

In some instances, some tests may be include both physical and electronic methods. For instance, three-dimensional multi-energy computed tomography scans may be used in conjunction with a physical test such as core flooding. Core flooding may include injecting fluids such as brine, oil, drilling fluid, acids, gels, foams, or the like into an LCM plug or core sample. The core sample may be a portion of a formation taken from a subterranean environment. Core flooding may indicate some properties of LCM plug or core sample such as, but not limited to, permeability, relative permeability, saturation change, formation damage caused by the fluid injection, interactions between the fluid and the rock, and the like. Core-flooding may be combined with three-dimensional multi-energy computed tomography scans by injecting a radio-opaque tracer into the LCM plug to monitor fluid movement inside the LCM plug or core sample. The tracer provides contrast between the various fluids of the core-flooding test to indicate saturation distribution, and saturation changes, gravitation effects, viscosity effects, network flow of fluids such bypassing and trapping, effects of heterogeneity on flow, and the like. The computed tomography during core-flooding may identify additional properties of the LCM plug or core sample and increase the resolution of the data obtained from core-flooding.

Figure 5:
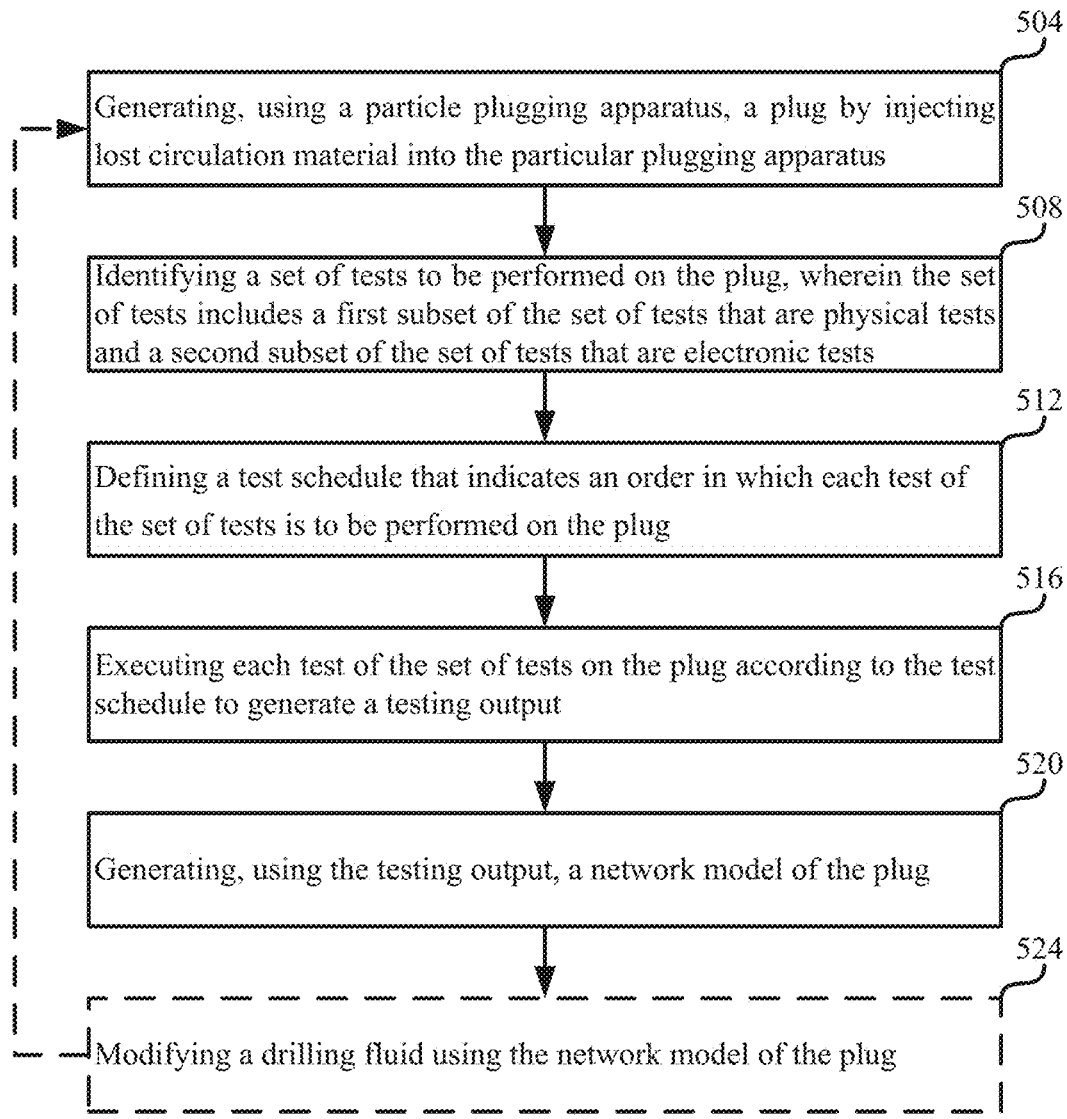
FIG. 5 is a flowchart of a process for analyzing and control the composition of lost circulation materials for drilling operations according to at least one aspect of the present disclosure.

FIG. 5 is a flowchart of a process for analyzing and control the composition of lost circulation materials for drilling operations according to at least one aspect of the present disclosure. At block 504, a plug may be generated using a particle plugging apparatus. In some instances, the plug may be generated by injecting a fluid such as, but not limited to a drilling fluid, lost circulation material, or other fluid into the particle plugging apparatus. The particle plugging apparatus may include one or more filter media, where each filter medium has characteristics that correspond to characteristics of formation within a subterranean environment a lost circulation material plug. In some instances, each filter may be composed of synthetic materials such as sintered metal, aluminum oxide, combinations thereof, or the like. In other instances, each filter may be composed of rock such as a core sample taken from the formation within the subterranean environment or rock that has characteristics that approximately match the characteristics of the formation.

The particle plugging apparatus may apply pressure to the fluid to force the fluid up against the filter medium. The plug may be formed by the filter cake, which may be the fluid that forms in front of the filter medium or filter medium is plugged by the fluid. Plugging may occur when particles of the fluid bridge the pores of the filter medium thereby preventing fluid from passing through the filter medium. Once prepared, the plug may be removed from the particle plugging apparatus for further testing.

At block 508 a set of tests can be identified. The set of tests may include one or more physical tests and one or more electronic tests. The set of tests may include a first subset that includes each of the physical tests and a second subset that includes each of the electronic tests. In some instances, the set of tests may include every available test. In other instances, since some tests may include results that overlap with other tests, only those tests that provide unique results may be selected from the physical tests and from the electronic tests. For instance, a three-dimensional multi-energy computed-tomography scan may indicate the mineralogical composition and permeability of the sample. Since a focused ion beam scanning electron microscope scan may also provide an indication of the permeability of the sample, the test may be skipped. A scanning electron microscope with energy dispersive electromagnetic spectroscopy scan may still be included in the test set as it provides characteristics of the plug that are not provided by other tests. The physical tests may be selected using the same criteria to prevent overlapping tests. However, in some instances, physical tests may still be included in the set of tests even though the physical tests provide the same or similar results of an electronic tests.

At block 512, a test schedule may be defined for the set of tests. In some instances, the test may be executed in a predefined order, in any order, in a hierarchical order such as test type, based on test type such as performing electronic tests prior to physical tests or vice versa, combinations thereof, or the like. For instance, some physical tests, such as thin section, may destroy or alter the plug, which may prevent some test types from being subsequently performed. Electronic tests may not destroy or alter the plug. As a result, if the test set includes physical tests that may be destroy or alter the plug, the test schedule may indicate the any electronic tests are to be performed before the those physical tests that may destroy or alter the plug. In addition, the test schedule may indicate that among the physical tests, the physical tests that do not destroy or alter the plug may be scheduled to be performed before those physical tests that may destroy or alter the plug.

At block 516, each test of the set of tests may be executed according to the test schedule. In some instances, the test schedule may be modified at runtime based on the results of a test or from an operator. For instance, if a first test produces inconclusive results or invalid results, the test may be performed again to obtain valid results or a different test that may test similar properties or characteristics of the plug may be performed before performing a subsequently scheduled test. In other instances, inconclusive results or invalid results for a test may cause a termination of the testing process. Upon terminating the testing process, control may return to block 504 in which a new plug may be generated. For instance, a test result indicating that porosity or permeability properties of the plug are unreasonably high or low, which may indicate a problem with the plug. Specifically, if the porosity of the plug is 100%, as determined by the ratio V/T where V may the volume of the void spaces within the plug and T may represent the volume of the overall plug, then the plug may not include any solid mass. Since this cannot be the case, a porosity value of 100% may indicate that either that the test failed or that the plug has degraded.

Prior to testing, an operator may indicate a low threshold value and a high threshold value for each property and characteristic of the plug tests. If a test result indicates a property or characteristic falls below the low threshold value or exceeds the high threshold value, it may be determined that the test failed or the plug has degraded. In some instances, the test may be rerun before determining that the plug has degraded and generating a new plug. In other instances, an operator may decide to re-run the test or to regenerate the plug.

Executing each test of the set of tests may generate an intermedia test result. The intermediate test results for each test may be aggregated into a testing output. In some instances, the testing output may include additional metadata associated with each test such as, but not limited to, testing conditions, devices used to perform the tests, one or more operators who performed or validated the test or its results, preliminary results, test calibrations, device calibrations, combinations thereof, and the like. In some instances, the metadata may be stored separately from the testing output.

At block 520, the testing output may be used to generate a network model of the plug. The network model may be generated by correlating the intermediate results of at least one electronic test with the results of at least one physical test. The correlated results may then be used build network model. For instance, each electronic test may produce an image of the plug that provides details of the pore geometry, permeability, material composition, and the like. Values for each property and characteristic may be obtained using a combination of image processing techniques and machine-learning. For instance, machine-learning models such as machine-learning models 232 of FIG. 2 may use scale-invariant feature transforms for feature detection in images. The features may be provide the values for properties and characteristics of the plug. In some instances, the features may be verified by obtaining similar features from other images obtained from other electronic tests.

The values may also be augmented by corresponding values obtained by the one or more physical tests. For instance, the values may be averaged to reduce the effect an outlier value may have on the resulting model. In some instances, the values derived from each test may be weighted prior to be used to generate the network model. For instance, some tests may be known to have a high degree of accuracy to test for certain types of properties or characteristics and a lesser degree of accuracy to test for other types of properties or characteristics. Values having a high-degree of accuracy may be weighted higher than those values having a lesser-degree of accuracy. The weights assigned to each value may reduce the likelihood of invalid values influencing the network model.

The correlated electronic and physical test values may then be used to generate the network model. The network model may include a representation of the pore networks within the plug. In some instances, the network model may include a two-dimensional or three-dimensional representation the pore networks. In some instances, the correlated values may be used input into the machine-learning model, which may output the network model. In other instances, the values may be processed by a combination of an operator and one or more computing devices such as computing device 252 of FIG. 2.

At block 524, the network model may be used to improve the composition of a drilling fluid at a drill site. For instance, the network model may indicate that the current drilling fluid is likely insufficient to bridge the pores of a formation at the drill site. The network model may be used to determine a particular formulation of lost circulation materials that may be added to the drilling fluid to successfully bridge the pores of the formation and likewise, reduce further damage to the formation. For instance, the network model may be used within a simulation to derive the effect of different fluids on the formation. The network model may be used to tailor the drilling fluids to the particular properties and characteristics of the subterranean environment. If, based on the network model, a modified to the drilling fluid is not needed, the process may terminate. If the drilling fluid is modified, control may return to block 504 where the new drilling fluid may be used to generate a new plug. The new plug may be tested using the same set of tests or a different set of tests to derive a new network model.

Each block of FIG. 5 may be executed any number of times before moving on to a subsequent block. For instance, defining a test schedule may be repeated until a satisfactory test schedule may be obtained. Further, the blocks of FIG. 5 may be executed in-order or out-of-order.

In some aspects, systems and methods for analyzing and defining drilling fluids are provided according to the following examples. As used below, any reference to a series of examples is to be understood as a reference to each of those examples disjunctively (e.g., "Examples 1-4" is to be understood as "Examples 1, 2, 3, or 4").

Example 1 is a system comprising: a particle-plugging apparatus including a first filter media, wherein the particle-plugging apparatus is configured to receive a lost circulation material and output a plug; and an LCM analyzer comprising one or more processors and a non-transitory computer-readable medium storing instructions that are executable by the one or more processors to cause the LCM analyzer to perform operations including: identifying a set of tests to be performed on the plug, wherein the set of tests includes a first subset of the set of tests that are physical tests and a second subset of the set of tests that are electronic tests; defining a test schedule that indicates an order in which each test of the set of tests is to be performed on the plug; executing each test of the set of tests on the plug according to the test schedule to generate a testing output; and generating, using the testing output, a three-dimensional network model of the plug usable to formulating one or more lost circulation materials for use in wellbore drilling operations.

Example 2 is the system of example 1, wherein the operations further include: receiving, based on one or more formations within a wellbore, a set of target property values, each target property value of the set of target property values corresponding to an optimal value of a property of the lost circulation material; calculating, using the testing output a value of at least one property of the lost circulation material; determining that a difference between the value of at least one property of the lost circulation material and a value of a corresponding target property value of the set of target property values exceeds a threshold; and modifying the lost circulation material such that the value of at least one property of the lost circulation material approximately equals the value of the corresponding target property value of the set of target property values.

Example 3 is the system of any of examples 1-2, wherein the first filter media includes a particular permeability that approximately matches a permeability of one or more formations within a wellbore.

Example 4 is the system of any of examples 1-3, wherein the particle-plugging apparatus is positionable to use a predetermined pressure to push the lost circulation material up against a filter medium for a predetermined time interval.

Example 5 is the system of any of examples 1-4, where the testing output includes correlating a first testing result from executing a first test from the first subset of the set of tests with a second test result from executing a second test from the second subset of the set of tests.

Example 6 is the system of any of examples 1-5, wherein the first subset of the set of tests includes one or more of: a poroperm test, a thin-section microscopy test, or a mercury injection capillary pressure test.

Example 7 is the system of any of examples 1-6, wherein the second subset of the set of tests includes one or more of: a three-dimensional dual computerized tomography scan, a three-dimensional focused ion beam and electron microscopy scan, or a scanning electron microscopy using energy-dispersive X-rays.

Example 8 is a method comprising: generating a plug using lost circulation material and a filter medium with one or more physical characteristics that correspond to a known formation within a subterranean environment; identifying a set of tests to be performed on the plug, wherein the set of tests includes a first subset of the set of tests that are physical tests and a second subset of the set of tests that are electronic tests; defining a test schedule that indicates an order in which each test of the set of tests is to be performed on the plug; executing each test of the set of tests on the plug according to the test schedule to generate a testing output; and generating, using the testing output, a three-dimensional network model of the plug usable to formulating one or more lost circulation materials for use in wellbore drilling operations.

Example 9 is the method of example 8, further comprising: receiving, based on one or more formations within a wellbore, a set of target property values, each target property value of the set of target property values corresponding to an optimal value of a property of the lost circulation material; calculating, using the testing output a value of at least one property of the lost circulation material; determining that a difference between the value of at least one property of the lost circulation material and a value of a corresponding target property value of the set of target property values exceeds a threshold; and modifying the lost circulation material such that the value of at least one property of the lost circulation material approximately equals the value of the corresponding target property value of the set of target property values.

Example 10 is the method of any of examples 8-9, wherein the one or more physical characteristics of the filter medium include a permeability of the filter medium.

Example 11 is the method of any of examples 8-10, further comprising: pushing the lost circulation material up against the filter medium for a predetermined time interval.

Example 12 is the method of any of examples 8-11, wherein generating the testing output includes correlating a first testing result from executing a first test from the first subset of the set of tests with a second test result from executing a second test from the second subset of the set of tests.

Example 13 is the method of any of examples 8-12, wherein the first subset of the set of tests includes one or more of: a poroperm test, a thin-section microscopy test, or a mercury injection capillary pressure test.

Example 14 is the method of any of examples 8-13, wherein the second subset of the set of tests includes one or more of: a three Three-dimensional dual computerized tomography scan, a three-dimensional focused ion beam and electron microscopy scan, or a scanning electron microscopy using energy-dispersive X-rays.

Example 15 is a non-transitory computer-readable medium that includes instructions that are executable by a processing device for causing the processing device to perform operations comprising: determining one or more physical characteristics of a filter medium that correspond to a known formation within a subterranean environment, the filter medium usable for generating a plug; identifying a set of tests to be performed on the plug, wherein the set of tests includes a first subset of the set of tests that are physical tests and a second subset of the set of tests that are electronic tests; defining a test schedule that indicates an order in which each test of the set of tests is to be performed on the plug; executing each test of the set of tests on the plug according to the test schedule to generate a testing output; and generating, using the testing output, a three-dimensional network model of the plug usable to formulating one or more lost circulation materials for use in wellbore drilling operations.

Example 16 is the non-transitory computer-readable medium of example 15, wherein the operations further comprise: receiving, based on one or more formations within a wellbore, a set of target property values, each target property value of the set of target property values corresponding to an optimal value of a property of a lost circulation material; calculating, using the testing output a value of at least one property of the lost circulation material; determining that a difference between the value of at least one property of the lost circulation material and a value of a corresponding target property value of the set of target property values exceeds a threshold; and modifying the lost circulation material such that the value of at least one property of the lost circulation material approximately equals the value of the corresponding target property value of the set of target property values.

Example 17 is the non-transitory computer-readable medium of any of examples 15-16, wherein the one or more physical characteristics of the filter medium include a permeability of the filter medium.

Example 18 is the non-transitory computer-readable medium of any of examples 15-17, wherein the testing output includes correlating a first testing result from executing a first test from the first subset of the set of tests with a second test result from executing a second test from the second subset of the set of tests.

Example 19 is the non-transitory computer-readable medium of any of examples 15-18, wherein the first subset of the set of tests includes one or more of: a poroperm test, a thin-section microscopy test, or a mercury injection capillary pressure test.

Example 20 is the non-transitory computer-readable medium of any of examples 15-20, wherein the second subset of the set of tests includes one or more of: a three Three-dimensional dual computerized tomography scan, a three-dimensional focused ion beam and electron microscopy scan, or a scanning electron microscopy using energy-dispersive X-rays.

While the principles of the disclosure have been described above in connection with specific apparatuses and methods, it is to be clearly understood that this description is made only by way of example and not as limitation on the scope of the disclosure.

What is claimed is:

1. A system comprising:
    a particle-plugging apparatus including a first filter media, wherein the particle-plugging apparatus is configured to receive a lost circulation material and output a plug; and
    an LCM analyzer comprising one or more processors and a non-transitory computer-readable medium storing instructions that are executable by the one or more processors to cause the LCM analyzer to perform operations including:

identifying a set of tests to be performed on the plug, wherein the set of tests includes a first subset of the set of tests that are physical tests and a second subset of the set of tests that are electronic tests;

defining a test schedule that indicates an order in which each test of the set of tests is to be performed on the plug;

executing each test of the set of tests on the plug according to the test schedule to generate a testing output; and generating, using the testing output, a three-dimensional network model of the plug usable to formulate one or more lost circulation materials for use in wellbore drilling operations.

2. The system of claim 1, wherein the operations further include:

receiving, based on one or more formations within a wellbore, a set of target property values, each target property value of the set of target property values corresponding to an optimal value of a property of the lost circulation material;

calculating, using the testing output a value of at least one property of the lost circulation material;

determining that a difference between the value of at least one property of the lost circulation material and a value of a corresponding target property value of the set of target property values exceeds a threshold; and modifying the lost circulation material such that the value of at least one property of the lost circulation material approximately equals the value of the corresponding target property value of the set of target property values.

3. The system of claim 1, wherein the first filter media includes a particular permeability that approximately matches a permeability of one or more formations within a wellbore.

4. The system of claim 1, wherein the particle-plugging apparatus is positionable to use a predetermined pressure to push the lost circulation material up against a filter medium for a predetermined time interval.

5. The system of claim 1, wherein the testing output includes correlating a first testing result from executing a first test from the first subset of the set of tests with a second test result from executing a second test from the second subset of the set of tests.

6. The system of claim 1, wherein the first subset of the set of tests includes one or more of: a poroperm test, a thin-section microscopy test, or a mercury injection capillary pressure test.

7. The system of claim 1, wherein the second subset of the set of tests includes one or more of: a three-dimensional dual computerized tomography scan, a three-dimensional focused ion beam and electron microscopy scan, or a scanning electron microscopy using energy-dispersive X-rays.

8. A method comprising:

generating a plug using lost circulation material and a filter medium with one or more physical characteristics that correspond to a known formation within a subterranean environment;

identifying a set of tests to be performed on the plug, wherein the set of tests includes a first subset of the set of tests that are physical tests and a second subset of the set of tests that are electronic tests;

defining a test schedule that indicates an order in which each test of the set of tests is to be performed on the plug;

executing each test of the set of tests on the plug according to the test schedule to generate a testing output;

generating, using the testing output, a three-dimensional network model of the plug; and formulating one or more lost circulation materials for use in wellbore drilling operations based on the three-dimensional network model of the plug.

9. The method of claim 8, further comprising:

receiving, based on one or more formations within a wellbore, a set of target property values, each target property value of the set of target property values corresponding to an optimal value of a property of the lost circulation material;

calculating, using the testing output a value of at least one property of the lost circulation material;

determining that a difference between the value of at least one property of the lost circulation material and a value of a corresponding target property value of the set of target property values exceeds a threshold; and modifying the lost circulation material such that the value of at least one property of the lost circulation material approximately equals the value of the corresponding target property value of the set of target property values.

10. The method of claim 8, wherein the one or more physical characteristics of the filter medium include a permeability of the filter medium.

11. The method of claim 8 further comprising:

pushing the lost circulation material up against the filter medium for a predetermined time interval.

12. The method of claim 8, wherein generating the testing output includes correlating a first testing result from executing a first test from the first subset of the set of tests with a second test result from executing a second test from the second subset of the set of tests.

13. The method of claim 8, wherein the first subset of the set of tests includes one or more of: a poroperm test, a thin-section microscopy test, or a mercury injection capillary pressure test.

14. The method of claim 8, wherein the second subset of the set of tests includes one or more of: a three Three-dimensional dual computerized tomography scan, a three-dimensional focused ion beam and electron microscopy scan, or a scanning electron microscopy using energy-dispersive X-rays.

15. A non-transitory computer-readable medium that includes instructions that are executable by a processing device for causing the processing device to perform operations comprising:

determining one or more physical characteristics of a filter medium that correspond to a known formation within a subterranean environment, the filter medium usable for generating a plug;

identifying a set of tests to be performed on the plug, wherein the set of tests includes a first subset of the set of tests that are physical tests and a second subset of the set of tests that are electronic tests;

defining a test schedule that indicates an order in which each test of the set of tests is to be performed on the plug;

executing each test of the set of tests on the plug according to the test schedule to generate a testing output; and generating, using the testing output, a three-dimensional network model of the plug usable to formulate one or more lost circulation materials for use in wellbore drilling operations.

16. The non-transitory computer-readable medium of claim 15, wherein the operations further comprise:
receiving, based on one or more formations within a wellbore, a set of target property values, each target property value of the set of target property values corresponding to an optimal value of a property of a lost circulation material;
calculating, using the testing output a value of at least one property of the lost circulation material;
determining that a difference between the value of at least one property of the lost circulation material and a value of a corresponding target property value of the set of target property values exceeds a threshold; and
modifying the lost circulation material such that the value of at least one property of the lost circulation material approximately equals the value of the corresponding target property value of the set of target property values.

17. The non-transitory computer-readable medium of claim 15, wherein the one or more physical characteristics of the filter medium include a permeability of the filter medium.

18. The non-transitory computer-readable medium of claim 15, wherein the testing output includes correlating a first testing result from executing a first test from the first subset of the set of tests with a second test result from executing a second test from the second subset of the set of tests.

19. The non-transitory computer-readable medium of claim 15, wherein the first subset of the set of tests includes one or more of: a poroperm test, a thin-section microscopy test, or a mercury injection capillary pressure test.

20. The non-transitory computer-readable medium of claim 15, wherein the second subset of the set of tests includes one or more of: a three Three-dimensional dual computerized tomography scan, a three-dimensional focused ion beam and electron microscopy scan, or a scanning electron microscopy using energy-dispersive X-rays.

* * * * *